J. H. AMES.
MACHINE FOR CUTTING DOME HEADS.
APPLICATION FILED APR. 5, 1909.
936,073.
Patented Oct. 5, 1909.
3 SHEETS—SHEET 2.
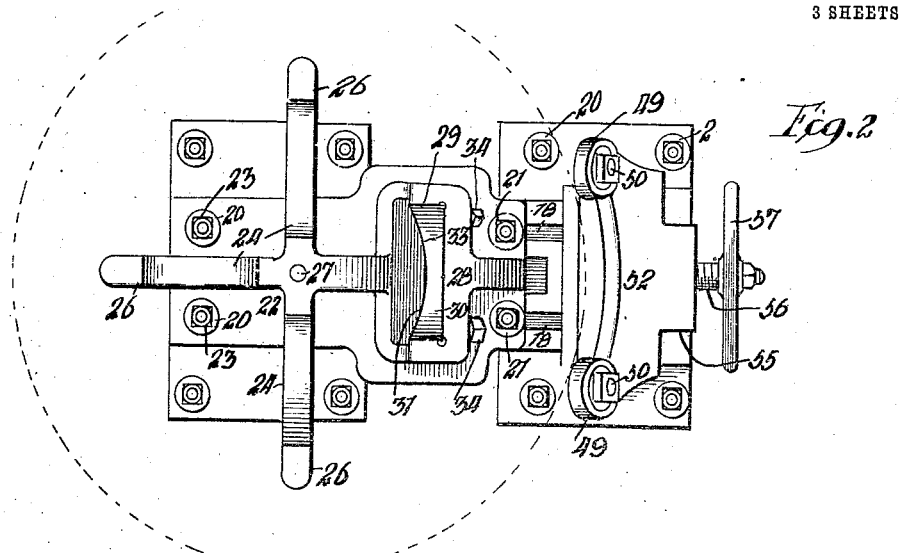
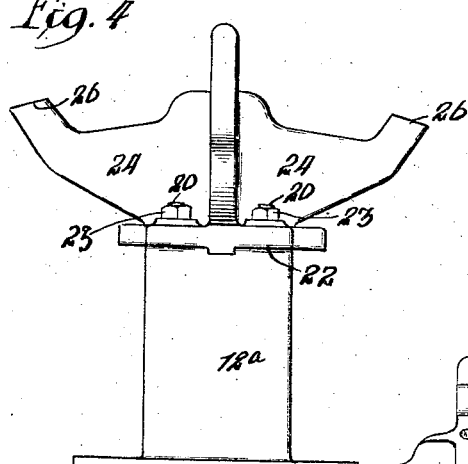
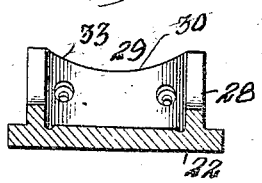
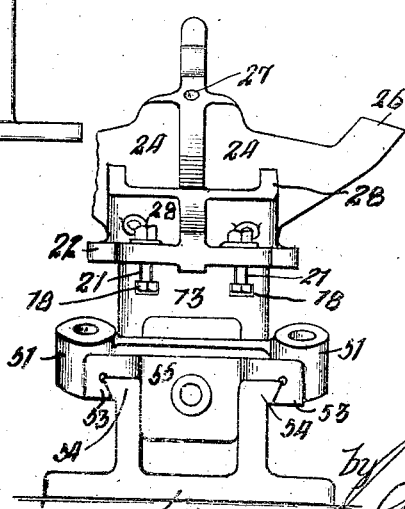
Witnesses:
Inventor:
Joseph H. Ames
by Attys

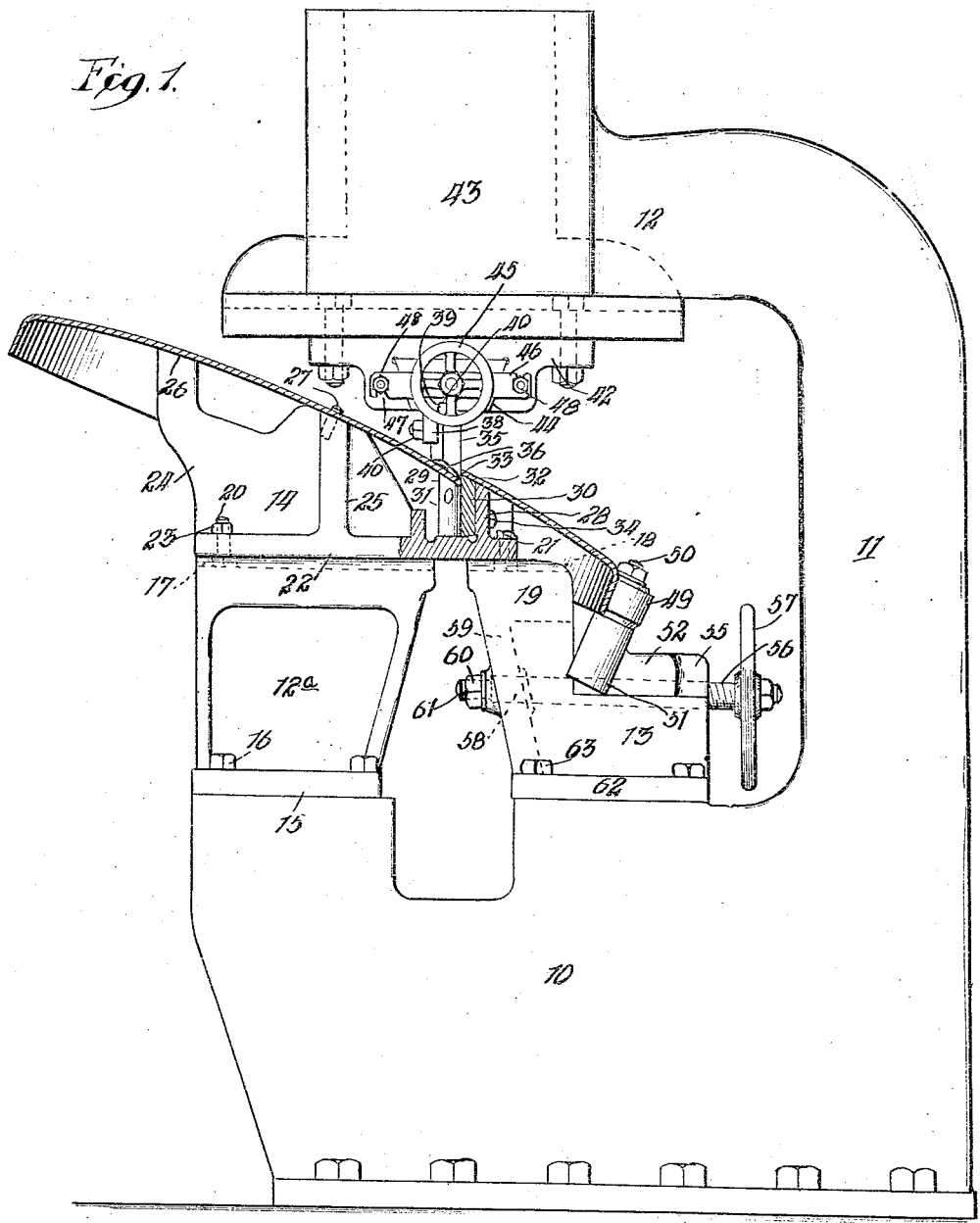

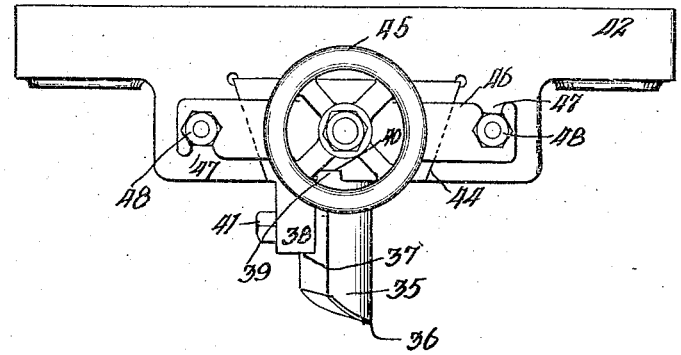
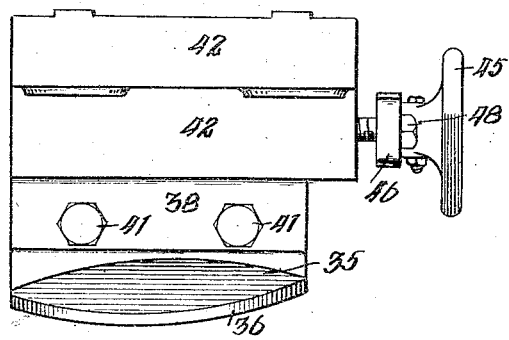
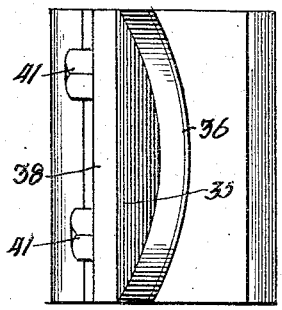

UNITED STATES PATENT OFFICE.

JOSEPH H. AMES, OF OAK PARK, ILLINOIS, ASSIGNOR TO AMERICAN CAR & FOUNDRY COMPANY, A CORPORATION OF NEW JERSEY.

MACHINE FOR CUTTING DOME-HEADS.

936,073.  Specification of Letters Patent.  Patented Oct. 5, 1909.

Application filed April 5, 1909. Serial No. 487,938.

*To all whom it may concern:*

Be it known that I, JOSEPH H. AMES, a citizen of the United States, residing at Oak Park, in the county of Cook and State of Illinois, have invented certain new and useful Improvements in Machines for Cutting Dome-Heads, of which the following is a specification.

The present invention relates to a machine for cutting dome heads of the style ordinarily employed for the heads of cylindrical tanks and similar structures, which dome heads are of concavo-convex formation and are provided around each edge with a cylindrical rib or flange, which affords a riveting surface for attachment to the cylindrical wall of the tank.

The machine is intended to cut a circular hole in the dome head; and the object of the invention is to so construct the machine that it can be adjusted to cut such holes in dome heads of varying size and in a rapid and perfect manner.

The invention relates particularly to the construction and arrangement of the shears or dies whereby this work is performed; to the construction, arrangement and mounting of the guide rollers for positioning the dome heads; to the construction of the frame for supporting the dome head in position during the cutting operation; and to the machine as a whole, constructed and arranged in the manner hereinafter set forth.

In the drawings, Figure 1 is an elevation, partly in section, of the cutting mechanism and associated parts of the present invention as applied to a punch press of standard type, showing only so much of the punch press as is necessary to explain the working of the present invention; Fig. 2 a plan view of the fixed shear and the supporting mechanism for the dome head; Fig. 3 a rear view of Fig. 2, with the rollers and fixed shear removed; Fig. 4 a front elevation of the supporting frame for the dome head; Fig. 5 a sectional detail of the fixed shear and its supporting member; Fig. 6 a front elevation of the movable shear and its carrying head; Fig. 7 a side elevation of the same; and Fig. 8 a plan view of the movable shear and the dovetail block.

The present invention is applied to a punch press having a frame of standard type, comprising a base portion 10, an upright portion 11, and an overhanging portion 12, which leaves a substantially rectangular recess for the reception of the various parts which comprise the present invention. The supporting or base portion affords a foundation for an outer casting 12$^a$ and an inner casting 13, the top surfaces of which are in alinement with one another and afford a support for an adjustable supporting frame 14. The outer casting is of generally rectangular shape having base flanges 15 which receive bolts 16, which secure it to the supporting or base portion of the machine frame, and said casting is provided, in its upper surface or floor, with two parallel T slots 17 which are in alinement with similar T slots 18 in the supporting portion 19 of the inner casting, which portion is built up from the body of the inner casting at the outer end thereof, as shown in Fig. 1. The T slots furnish guideways for a pair of front bolts 20, and a pair of similar rear bolts 21, which are entered through a base plate 22 of the adjustable supporting frame 14, the bolts being provided with the usual nuts 23 which permit the frame to be locked or clamped in adjusted position. The supporting frame 14 comprises a longitudinally extending rib 24 into which merge the sections of the transversely extending rib 25, which flares outwardly on each side toward its upper edge 26, as shown in Fig. 2. The upper edge 26 is rounded from end to end to conform to the concavity on the inner surface of the dome head; and the edge is beveled downwardly from front to rear in order to support the dome head at an angle to the horizontal plane of the machine. The point of intersection of the longitudinal rib and the transverse rib indicates the center support for the dome head, and the longitudinal rib is given an upward slope from rear to front commensurate with the curve of the dome head and the angle at which it is supported.

In order to maintain the dome head properly centered, a center pin 27 is located at the point of intersection of the supporting ribs, which center pin extends at right angles to the general plane of the dome head at its center point. The dome head is further supported upon a low rear cross rib 28 which serves as a backing for a lower stationary shear blade 29. The lower blade is of rectangular formation on its rear or nonacting face 30, which enables it to fit snugly into it the angle afforded between the rib 28 and the base of the adjustable frame. The front or acting face 31 of the lower shear blade is given a curvature commensurate with the curvature of the intended hole, and the upper edge 32 of the blade is beveled to conform to the slope of the dome head at the point intended to be cut. The forward angle of the upper edge constitutes the cutting edge 33 which is given a downward dip or curvature toward its center as indicated in Fig. 5, which is necessary in order to compensate for the curved or concaved formation of the cutting face of the knife, and at the same time bring up portions of the upper edge of the lower knife into contact with the dome head supported thereon. This will be understood when it is remembered that the dome head is supported at an angle. The lower or fixed shear is secured in place by means of diagonally extending bolts 34 the heads of which abut against the rear face of the backing rib 28. The fixed shear coöperates with a movable shear 35 whose cutting edge is beveled, and whose cutting face 36 is convexed to register with the concavity of the fixed shear, and the cutting edge is given a downward curvature toward its center commensurate with the convexity of the rear or cutting face of the shear, which curvature is somewhat more pronounced, and is drawn on a sharper radius than the dip or curvature of the fixed shear with which it coöperates. The nonacting face of the shear, unlike the acting face thereon, is straight or plain except for a jog 37 which receives a straight flange 38 of uniform thickness from end to end, which flange depends from a shear block 39 of dovetail formation. The shear is furthermore provided on its upper edge with a tongue 39 which enters a groove 40 in the shear block. The shear is held in place by means of a pair of screw bolts 41, which are entered through the flange 38 and into the body of the shear, which is thus held firmly and rigidly in engagement with the shear block. The latter is carried by a guide block 42 bolted to the lower end of a plunger 43 of the usual type. The guide block 42 is provided with a transversely extending dovetail groove 44 which receives the shear block, which latter is provided with a screw adjusting wheel 45 which is threaded into one end of the shear block and is journaled through a locking bar 46 provided at opposite sides at each end with a recess 47, forming in effect oppositely disposed hooks which are adapted to engage the shanks of a pair of locking bolts 48, the construction being one whereby the shear block can be inserted in its groove or socket and thereafter the locking bar turned to position to engage the locking bolts, after which the shear block can be laterally adjusted to any desired position.

The lower edge of the dome head rests against and is supported by a pair of rollers 49 which are journaled upon a pair of pintles 50 located on opposite sides of the rectangular center of the machine, and get in parallel relation with the flange of the dome head intended to be cut. The pintles 50 are socketed within diagonally set sleeves 51 on opposite sides of and cast integrally with a roller carriage 52 in the form of a flat transversely elongated plate provided at its sides with depending undercut flanges 53 which are adapted to engage with and be guided by a pair of parallel beveled guide rails 54 formed on the sides of the rear casing 13. The carriage is further provided at its rear end with a depending lug 55 through which is threaded an adjusting screw 56 carrying a hand wheel 57 to facilitate adjustment, and the inner end 58 of the adjusting screw is shouldered down and journaled through the forward wall 59 of the casting 13, being held in place by means of a nut 60 entered onto a threaded stud 61 on the forward end of the adjusting screw. The casting 13 is cored out on its interior to reduce the weight and to afford a clearance for the adjusting screw which is journaled at its forward end only, its rear end being supported by the lug on the roller carriage. The rear casting 13, like the forward casting 12, is provided with side flanges 62 which receive bolts 63 which secure it to the base portion of the machine.

In use, a dome head is first punched with a hole in its center of a size to receive the center pin 27, but this punching does not injure the dome head in any way since the center portion is intended to be cut out. The hole in the dome head is then brought into register with the pin and laid upon the sloping surface of the supporting frame and supported by the longitudinally extending and transversely extending ribs, after which the roller carriage is adjusted to bring the rollers into engagement with the adjacent portion of the dome flange. The dome head is now in the position to be cut, and with each descent of the plunger the upper and lower shears will coact to shear or cut the dome head, the inner or cut away portion being forced down with the descent of the upper shear into the position indicated in Fig. 1, the outer portion of the dome head being supported upon and held against this portion by the upper edge of the lower shear upon which it rests. By revolving the dome head with each cut of the shears, the circular inner piece of the dome head will be cut away from the remainder thereof as waste, leaving in the dome head a clean cut having beveled edges. By reason of the angle at which the dome head is supported, and the side range of the supporting surfaces, tilting of the dome will be prevented during the cutting operation, and an easy method of rotatably feeding the dome will be afforded.

It is not the intention to limit the invention strictly to the use of shears for performing the cutting operation since, in place thereof, dies adapted to entirely remove a section of metal could be substituted, and it will be understood that in the claims in which cutting members, or the like, are referred to it is the intention to embrace die members as well as shear members.

The method of supporting the dome at an oblique angle with respect to the movement of the shear is highly important in that a beveled edge is required in the operation of calking the seam formed around the center opening in the completed dome head.

What I claim as new and desire to secure by Letters Patent is:

1. In a machine of the class described, the combination of a work-supporting frame having a diagonally disposed supporting surface, adjustable guide rollers adapted to bear against the edge of the work, and cutting members located on opposite sides of the work and adapted, with each actuation, to make a circular cut for cutting away, with successive cuttings, a circular piece from the center of the work, substantially as described.

2. In a machine of the class described, the combination of a work-supporting frame having a diagonally disposed supporting surface, adjustable guide rollers adapted to bear against the edge of the work, and fixed and movable shear members on opposite sides of the work, the supporting frame adjacent to the acting face of the shear member being cut away to afford a clearance for the depression of the waste section of the work when cut away and forced back by the movable shear member, substantially as described.

3. In a machine of the class described, the combination of a work-supporting frame having a diagonally disposed supporting surface, means for supporting the lower edge of the work when resting upon the diagonally disposed supporting surface, said means permitting rotation of the work for cutting out a piece from the center of the work, and fixed and movable shear members on opposite sides of the work, the supporting frame adjacent to the acting face of the fixed shear member being cut away to afford a clearance for the depression of the waste section of the work when cut away and forced back by the movable shear member, substantially as described.

4. In a machine of the class described, the combination of a supporting frame for the work, fixed and movable shear members adapted to engage opposite sides of the work and adapted to make a circular cut with each actuation of the movable member, and successive cuts serving to sever a circular section from the center of the work, and the supporting member being cut away adjacent to the acting face of the fixed member for permitting the waste section of the work to be forced back by the engagement of the movable member, substantially as described.

5. In a machine of the class described, the combination of a supporting frame for the work, fixed and movable shear members adapted to engage opposite sides of the work and adapted to make a circular cut with each actuation of the movable member, successive cuts serving to sever a circular section from the center of the work, and the supporting member being cut away adjacent to the acting face of the fixed member for permitting the waste section of the work to be forced back by the engagement of the movable member, and guide rollers for engaging the edge of the work, substantially as described.

6. In a machine of the class described, the combination of a supporting frame for the work, fixed and movable shear members adapted to engage opposite sides of the work and adapted to make a circular cut with each actuation of the movable member, successive cuts serving to sever a circular section from the center of the work, and the supporting member being cut away adjacent to the acting face of the fixed member for permitting the waste section of the work to be forced back by the engagement of the movable member, guide rollers for engaging the edge of the work, a roller carriage upon which the guide rollers are carried, and means for adjusting the carriage toward and from the center of the work, substantially as described.

7. In a machine of the class described, the combination of a work-supporting frame, a fixed shear secured to said frame and having a concavely curved inner or acting face, and a movable shear co-acting therewith and having a convex acting face, the work-support being cut away adjacent to the acting face of the fixed shear to permit of the bending back of the waste section of the work by the engagement of the movable shear, substantially as described.

8. In a machine of the class described, the combination of a work-supporting frame, a fixed shear secured to said frame and having a concavely curved inner or acting face, a movable shear co-acting therewith and having a convex acting face, the work-support being cut away adjacent to the acting face of the fixed shear to permit of the bending back of the waste section of the work by the engagement of the movable gear, a reciprocating member provided with a guide slot, a shear block adapted to be adjusted within said slot and to which the movable shear is secured, an adjusting screw entered into the shear block, and a locking bar through which the adjusting screw is journaled, said bar being removably secured to the reciprocating member, substantially as described.

9. In a machine of the class described, the combination of a work-supporting frame, a fixed shear secured to said frame and having a concavely curved inner or acting face, a movable shear co-acting therewith and having a convex acting face, the work-support being cut away adjacent to the acting face of the fixed shear to permit of the bending back of the waste section of the work by the engagement of the movable gear, a reciprocating member provided with a guide slot, a shear block adapted to be adjusted within said slot and to which the movable shear is secured, an adjusting screw entered into the shear block, a locking bar through which the adjusting screw is journaled, said bar being provided, near its ends, on opposite sides, with a pair of recesses furnishing, in effect, hooks at each end of the bar, and bolts outwardly projecting from the reciprocating member, with which said hooks are adapted to engage, substantially as described.

10. In a machine of the class described, a reciprocating member provided with a guide recess, a block adjustably entered within said recess, a cutting member carried by said block, an adjusting screw entered into said block, a locking bar removably connected with the reciprocating member, through which bar the adjusting screw is journaled, and a fixed cutting member coöperating with the reciprocating cutting member, substantially as described.

11. In a machine of the class described, a reciprocating member provided with a guide recess, a block adjustably entered within said recess, a cutting member carried by said block, an adjusting screw entered into said block, a locking bar provided in each end and on opposite sides with a recess, giving to the bar a hook formation at each end, bolts outwardly projecting from the reciprocating member with which said hooks are adapted to engage, and a fixed cutting member coöperating with the reciprocating cutting member, substantially as described.

JOSEPH H. AMES.

Witnesses:
 WALKER BANNING,
 PIERSON W. BANNING.